(12) United States Patent
Samuels et al.

(10) Patent No.: US 6,247,389 B1
(45) Date of Patent: Jun. 19, 2001

(54) POLYMER CUTTING APPARATUS AND METHOD

(75) Inventors: Michael Robert Samuels, Wilmington, DE (US); Marion Glen Waggoner, Landenberg, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/479,709

(22) Filed: Jan. 7, 2000

Related U.S. Application Data

(63) Continuation of application No. PCT/US97/17630, filed on Sep. 29, 1997.

(51) Int. Cl.$^7$ ...................................................... B26D 1/00
(52) U.S. Cl. ............................ 83/13; 83/349; 83/508.3; 83/674
(58) Field of Search .................. 83/674, 349, 508.3, 83/99; 30/346.55, 357

(56) References Cited

U.S. PATENT DOCUMENTS

| 1,762,875 | 6/1930 | Metzger . | |
|---|---|---|---|
| 2,180,204 | 11/1939 | Hallden | 164/70 |
| 2,961,910 | 11/1960 | Grassman | 83/470 |
| 3,583,267 | 6/1971 | Topolski et al. | 83/15 |
| 3,742,565 * | 7/1973 | Boboltz et al. | 29/105 |
| 3,760,673 | 9/1973 | Peterson, Jr. | 83/349 |
| 3,831,482 | 8/1974 | Eichler et al. | 83/675 |
| 3,989,196 | 11/1976 | Urschel | 241/27 |
| 4,090,674 | 5/1978 | Marshall et al. | 241/221 |
| 4,303,605 * | 12/1981 | Lichfield | 264/158 |
| 4,392,402 | 7/1983 | Rann | 83/345 |
| 4,728,275 * | 3/1988 | DiLullo et al. | 83/99 |
| 5,097,879 * | 3/1992 | Rice, Sr. | 241/92 |
| 5,191,819 | 3/1993 | Hoshi | 83/349 |
| 5,658,601 * | 8/1997 | Hoshi | 83/675 |

FOREIGN PATENT DOCUMENTS

| 25 38 174 A 1 | 3/1977 | (DE) | B02C/18/44 |
|---|---|---|---|
| 0 377 060 A 1 | 7/1990 | (EP) | B27G/13/04 |
| 2 257 084 | 1/1993 | (GB) | B26D/1/38 |

OTHER PUBLICATIONS

Patent Abstracts of Japan, *Synthetic Resin Material Feeder*, Publication No. 08318532; Applicant Japan Crown Cork Co. Ltd., Inventor Ienaga Tetsuo, Mar. 12, 1996.

Patent Abstracts of Japan, *Hot–Cutting Device of Resin*, Publication No. 05169441, Applicant Sekisui Plastics Co. Ltd., Inventor Yamashita Tsuyoshi, Jul. 9, 1993.

* cited by examiner

*Primary Examiner*—M. Rachuba
(74) *Attorney, Agent, or Firm*—Thomas H. Magee

(57) ABSTRACT

A polymer cutter with a rotary cutting head in which the cutting edges are on the circumferential periphery of the head, and in which the cutting edges shear rather than slice the polymer is described. The knife blades on the rotary head have a cutting edge angle of greater than 70°. The apparatus is especially useful for cutting thermoplastics and may be used for preparing polymer granules or pellets.

20 Claims, 6 Drawing Sheets

POLYMER CUTTING APPARATUS AND METHOD

This application is a continuation of PCT/US97/17630 filed Sep. 29, 1997.

FIELD OF THE INVENTION

This invention concerns a rotary cutting head for cutting polymer, especially polymer strands and the like, and a process for cutting polymer using this head.

TECHNICAL BACKGROUND

Polymers are abundant and important items of commerce, being useful in a myriad of applications. During handling, processing or reclamation of polymers it is often necessary to cut the polymers into smaller pieces of various sizes and/or configurations. For instance, when thermoplastics are produced they are often cut into pellets or granules of relatively small size so they can be easily fed to a forming machine such as an injection molding machine or an extruder.

Cutters for polymers are available in many forms. In one common form a rotary head containing knives approximately parallel to the axis of rotation is used to cut polymer against a bed knife as the polymer is being fed into the cutter head. Such a cutter is pictured schematically in FIG. 2. In these cutters the knives are such that they cut by a slicing action, with a narrow leading cutting edge slicing through the polymer. While cutters of this type have been popular for many years, they have certain drawbacks. Among these is cutter knife breakage and/or wear, especially when hard and/or abrasive polymers are being cut. It is believed that when knives with sharp acute cutting angles are used, the small amount of metal at the cutting edge makes that edge relatively weak and prone to breakage and/or relatively fast wear. When breakage or excessive wear occurs, the cut quality is adversely affected, and the cutter must be shut down to resharpen or replace the worn or broken blades. This downtime is expensive in both actual maintenance costs and lost production time, and a polymer cutting apparatus which can cut at high speed with good cut quality, while at the same time requiring less downtime, would be advantageous.

SUMMARY OF THE INVENTION

This invention involves a rotary cutter head having an axis of rotation, comprising, one or more knives, each knife having a cutting edge on a circumferential periphery of said rotary cutter head, each knife having a knife angle of about +10° to about −15°, and a cutting edge angle of 70° or more, and provided that no point on a cutting face of said knife is further from said axis of rotation of said rotary cutter head than said cutting edge.

Also described herein is a rotary cutter for cutting polymer, comprising, a bed knife, a rotary cutter head, and a means for advancing polymer into said rotary cutter head, and wherein said rotary cutter head has an axis of rotation and one or more knives, each knife having a cutting edge on a circumferential periphery of said rotary cutter head, each knife having a knife angle of about +10° to about −15°, and a cutting edge angle of 70° or more, and provided that no point on a cutting face of said knife is further from said axis of rotation of said rotary cutter head than said cutting edge.

This invention also concerns a process for cutting polymer with a rotary cutter, wherein the improvement comprises, using a rotary cutter head which has an axis of rotation and one or more knives, each knife having a cutting edge on a circumferential periphery of said rotary head, each knife having a knife angle of about +10° to about −15°, and a cutting edge angle of 70° or more, and provided that no point on a cutting face of said knife is further from said axis of rotation of said rotary head than said cutting edge.

BRIEF DESCRIPTION OF THE DRAWINGS

FIG. 5 shows the body of the rotary cutter head used in the Example, with dimensions shown in cm. FIG. 5a shows a plan view of the body, while

DETAILS OF THE INVENTION

By a polymer herein is meant a polymer itself containing no additives, as well as polymers containing any additive or any combination of additives normally found in polymers. Such additives include pigments such as $TiO_2$, antioxidants, antiozonants, toughening agents, flame retardants, lubricants, dyes, antistatic agents, antistaining agents, and fillers and reinforcing agents such as talc, clay, carbon black, milled glass, glass fiber, carbon fiber, and aramid fiber. Preferred polymers are plastics (as opposed to elastomers), and thermoplastics are especially preferred.

Figure 1:
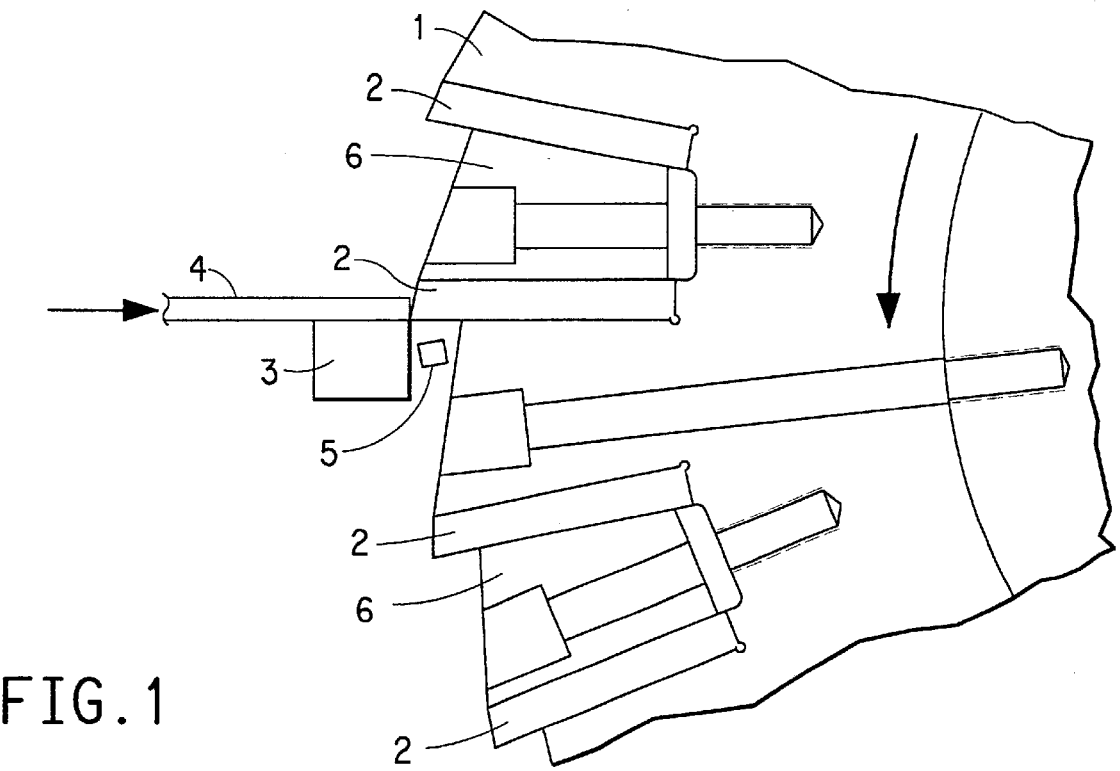
FIG. 1 shows a cross section perpendicular to the axis of rotation of part of a typical rotary cutting head of this invention, together with a bed knife, a polymer strand and a cut polymer particle.

FIG. 1 is a general view of a cross section of part of a rotary cutter head, and other parts of a cutting apparatus, according to this invention. The parts of the rotary cutter head shown are 1 the rotary cutter head body which rotates in the direction shown, several knives 2, and two wedges 6 which hold the knives in place on 1 (as with bolts, whose holes are shown, but the bolts are not shown). Also shown is a stationary bed knife 3 whose mounting is not shown, a polymer strand 4 which is being fed in the direction shown, and a polymer granule 5 which has just been cut.

Figure 2:
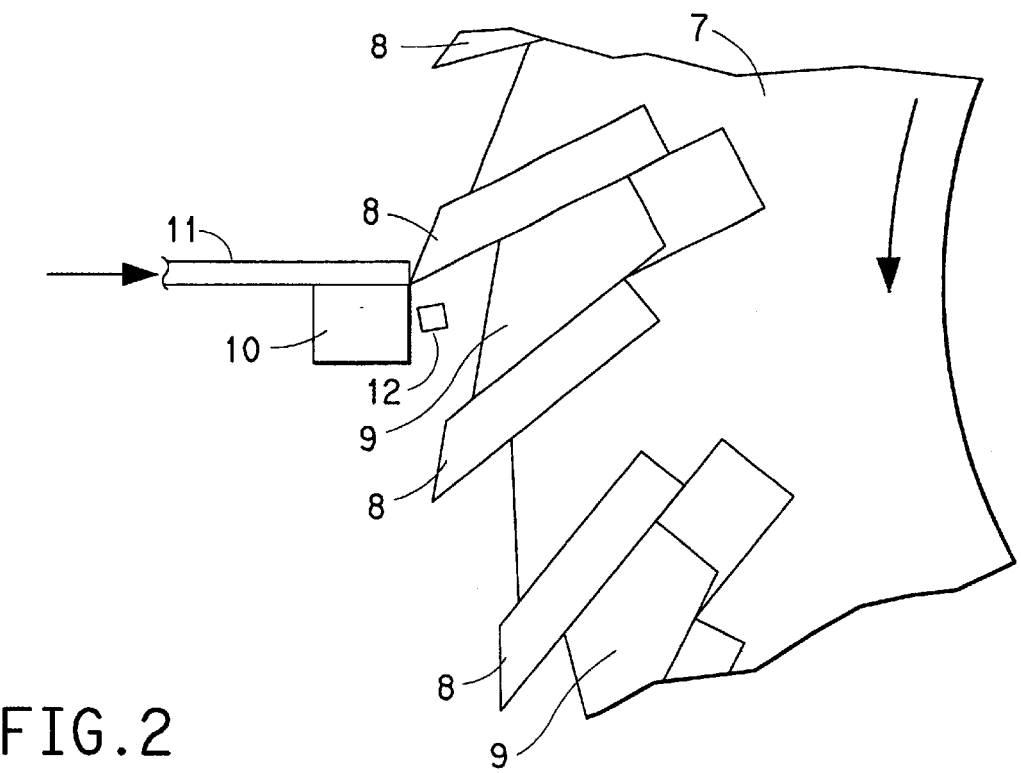
FIG. 2 shows a cross section perpendicular to the axis of rotation of part of a typical rotary cutting head of conventional design, together with a bed knife, a polymer strand and a cut polymer particle.

In contrast FIG. 2 shows a similar view of a conventional polymer cutter which has rotary cutter body 7, several knives 8, and wedges 9 to hold the knives in place. Also shown are a bed knife 10, polymer strand 11, and cut polymer granule 12.

As can be seen by a general comparison of FIGS. 1 and 2, the major difference between the instant invention and the conventional cutter is that the conventional cutter acts in a cutting mode, much as a razor blade does in cutting a beard, while the cutter of this invention acts more by shearing off the polymer. In both cutters it is preferred that clearance between the cutting edge of each knife and the bed knife be as small as practicable. This tends to give the cleanest cut, and is usually about 0.025 to about 0.25 mm, preferably about 0.050 to about 0.12 mm.

Generally speaking, in such cutters the polymer is advancing into the rotor knives continuously, so after the cutting edge of each knife passes the bed knife, each cutter knife is raked away from the edge of the bed knife. In other words, the point on the knife furthest away from the axis of rotation of the rotary cutter head is normally the cutting edge of the knife, and all points on the cutting edge face are closer to the axis of rotation of the rotary cutter head than the cutting edge. Furthermore, if applicable, the rotary cutter head or its parts other than the knives are also preferably designed to allow the polymer to advance. In the case of FIG. 1, the rotor body and wedges are raked away from the periphery of the cutter head as shown. Other designs will be obvious to the artisan to accomplish this.

The knives may be separate parts which can be removed from the rotary cutter head for sharpening or replacement, or other configurations are possible, which can be held in the rotary cutter head by bolts, or as shown by wedges. Or the rotary cutter head may be a single piece of metal, with the knife edges hardened. This eliminates much machining of wedges, holes, etc., which are shown in FIG. 1. This is particularly useful where the knife edges don't chip or need sharpening very often.

Figure 3:
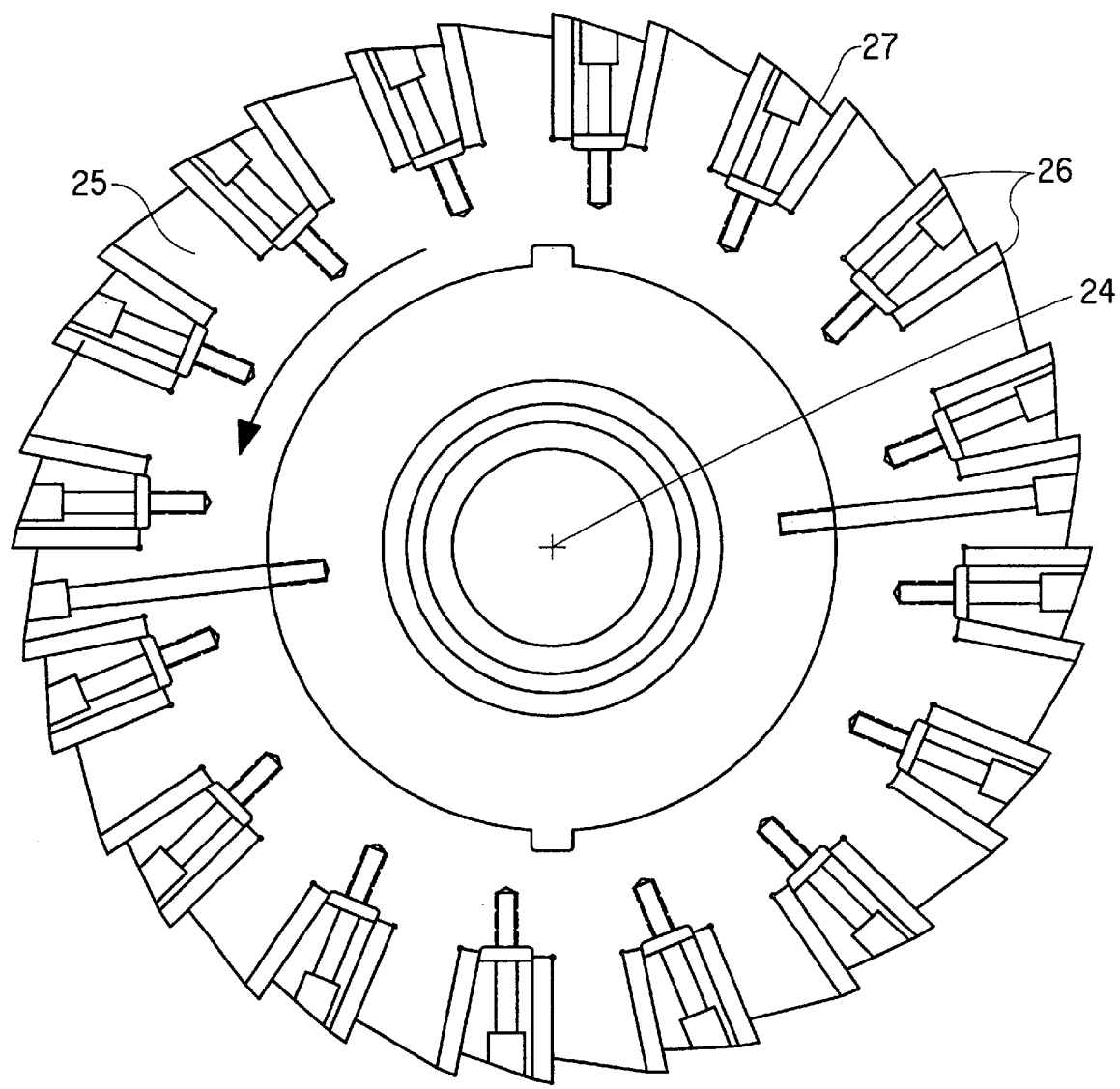
FIG. 3 shows a cross section perpendicular to the axis of rotation of a typical rotary cutter head of this invention.

FIG. 3 shows a cross section perpendicular to the axis of rotation of a full rotary cutter head according to this invention. This head has a center of rotation 24, a body 25, a multiplicity of knives 26, held to the body with a multiplicity of wedges 27. In operation the head rotates in the direction shown.

Figure 4:
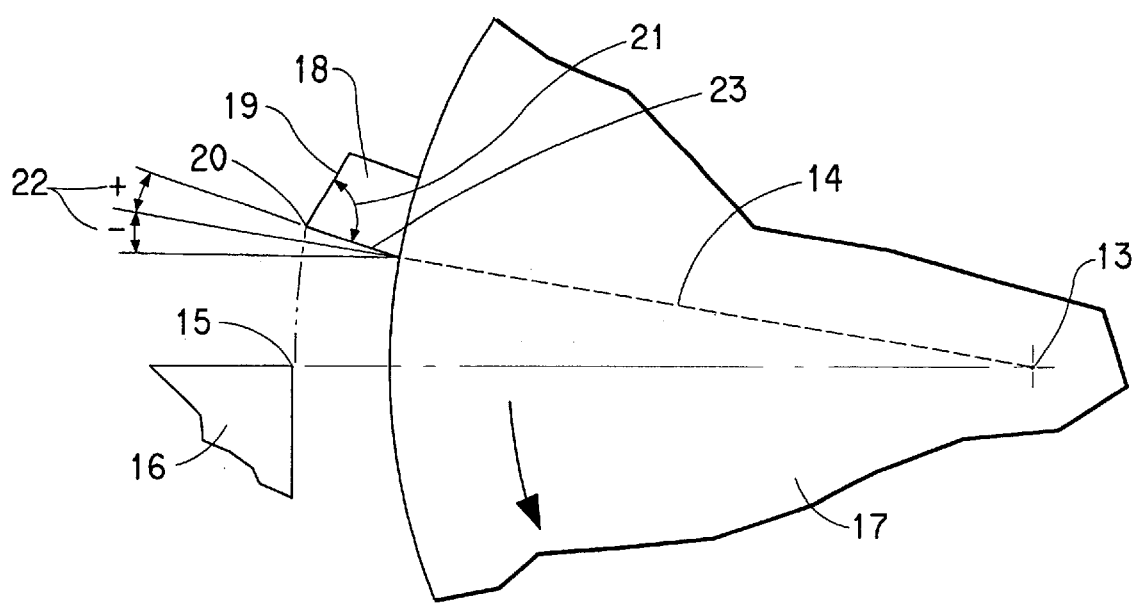
FIG. 4 shows schematically important elements of a rotary cutter head of this invention, as defined herein.

FIG. 4 is a schematic diagram showing important elements of the rotary cutter head of this invention and their relationship to each other. Also included for completeness is a bed knife. The rotary head cutter of FIG. 4 has an axis of rotation 13. For convenience in explanation a dashed line 14 (which is in fact a radius) has been drawn from 13 to the point at which a knife, 18 protrudes from 17, the cutter body. Also included in FIG. 4 is a bed knife 16 having cutting edge 15. Protruding from the body 17 of the rotary cutter head is knife 18 (of course more than one knife may be present), which has knife cutting face 19, and cutting edge 20. In addition the knife also has cutting edge angle 21, a knife forward surface 23, and knife angle 22. 22 is measured from a radius such as 14 extended through the point at which 18 protrudes from 17. Positive and negative angles of 22 are indicated on FIG. 3.

Normally the position of 16 and 17 will be such that 15 will be approximately parallel to 13, and this position also will preferably minimize the clearance between 15 and 20 when the rotary cutter head is in operation.

The cutting edge angle of the knife, 21, is at least 70° or more, preferably about 80° or more. This angle is the angle between the knife cutting face 19 and the knife forward surface 23. If one or both of 19 and 23 is (are) curved, then 21 is taken as the angle between the tangent and the other arm of the angle or between the two tangents, (on one or both of 19 and 23) at 20. The maximum value of 21 is determined by 22 and the requirement that no part of 19 be further from 13 than 20. Since 21 is a relatively large angle, there is a considerable amount of metal (or other knife material) around, and especially in back of, 20. It is believed that this material near the cutting edge makes 20 stronger, and thus less prone to chip. The massive amount of material about 20 also is believed to retard wear, thus reducing the frequency at which 20 must be resharpened.

In addition, 22 is the angle between a radius from 13, and 23 (or a tangent to 23 at 20 if 23 is a curved surface), and is about +10° to about −15°, preferably about 0° to about −5°, and especially preferably about 0°. If 22 is too positive, the shearing action of 20 against 15 may be impaired, therefore leading to poorly cut polymer, and if 22 is too negative, it may not be possible to make 21 large enough.

No point on 19 should be further away from 13 than 20. This follows simply from the fact that one normally prefers to have 20 as close to 15 as is practicably while polymer is being cut. If any part of 19 is further from 13 than 20, one simply will not be able to place 20 as close to 15 as is preferred, without having 19 strike 15 when 17 is rotating. Of course as 20 suffers some wear from cutting polymer, a small portion of 19 immediately adjacent to 20 may be further from 13 than the actual edge of 20. This is permissible, but of course when 20 becomes badly worn it will preferably be sharpened to maintain a good polymer cut quality.

Figure 5A:
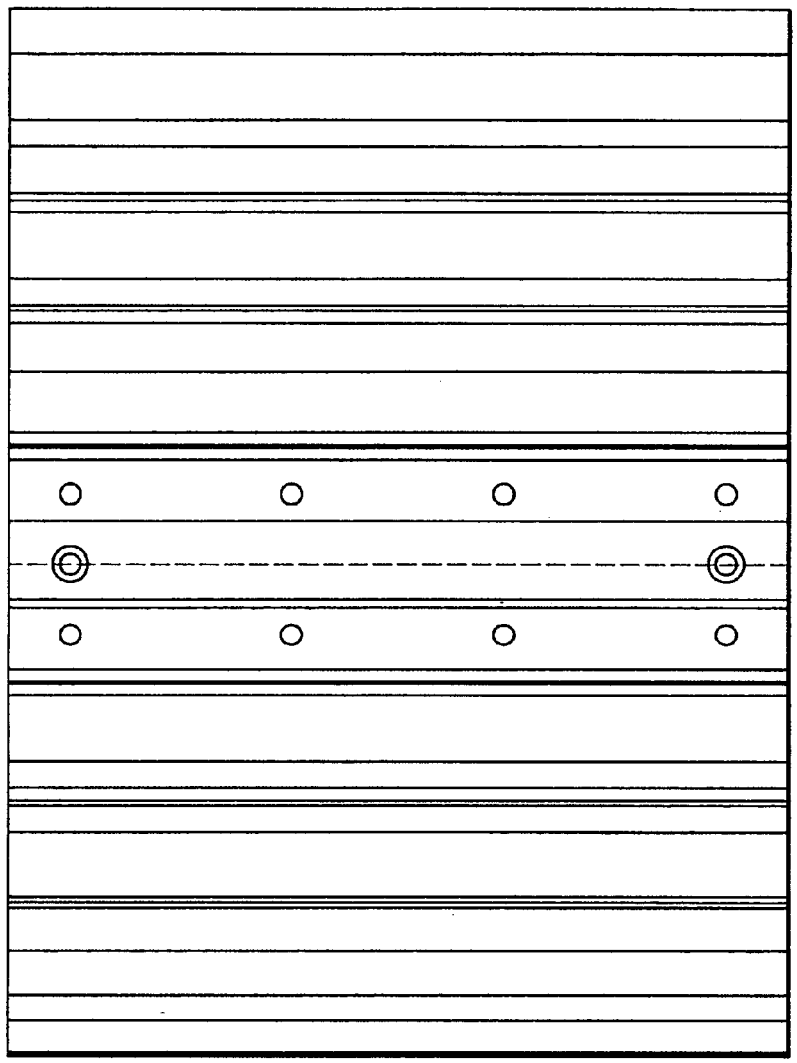
Figure 5B:
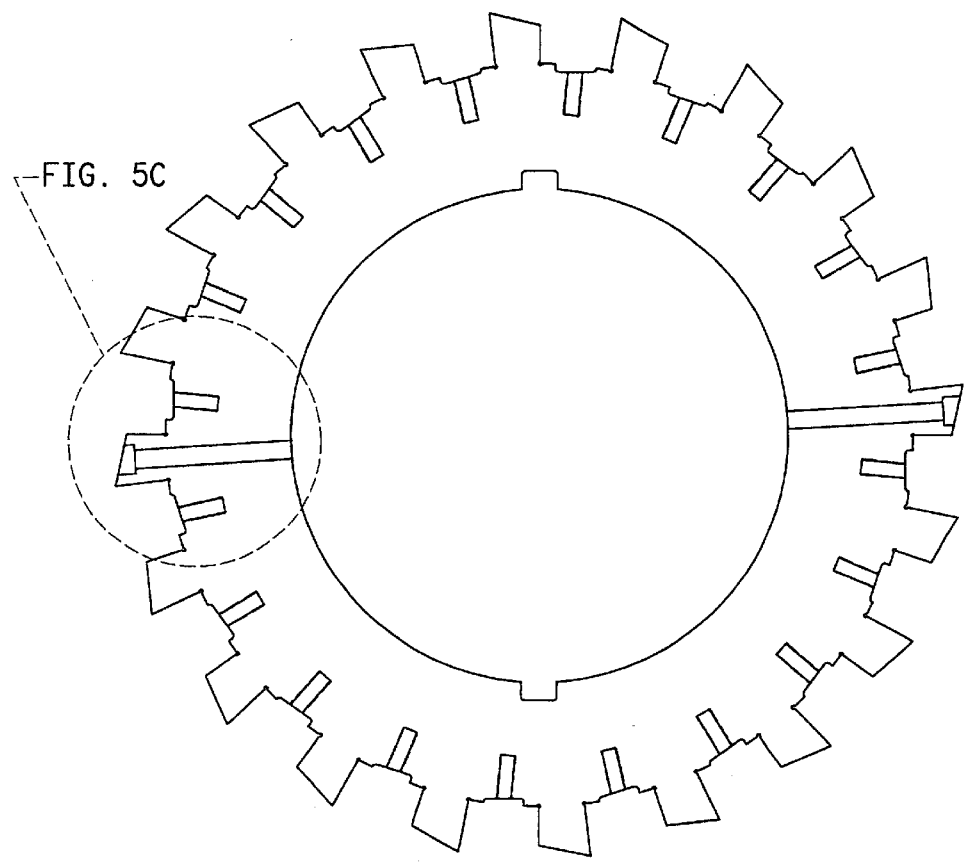
FIG. 5b shows a cross section of the body perpendicular to the axis of rotation.
Figure 5C:
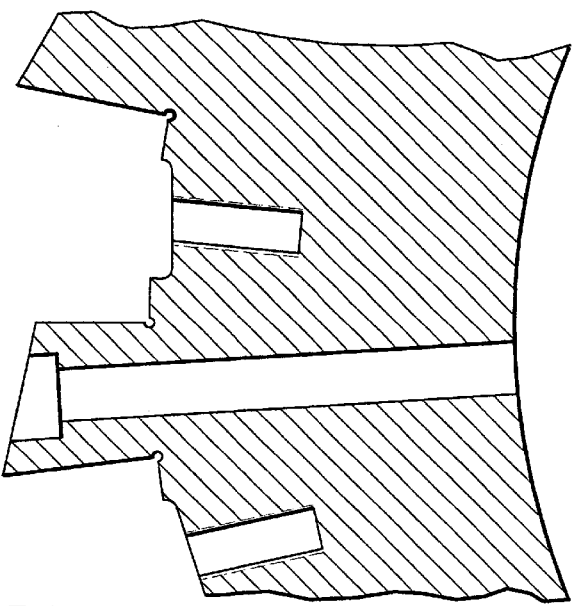
FIG. 5c shows a detailed section of FIG. 5b, as indicated.

It is preferred, although not necessary, that some, and more preferably all, of the knives 18 run the full length of 17. This is shown in FIG. 5.

Across the length of 17 (perpendicular to the cross section shown in FIG. 3), 20 may be parallel to 13, or may be helically disposed to 13, with essentially the entire length of 20 being at a constant distance from 13. A preferred helical angle is about 0° to about 3° from 13. When 17 is quite long, and for instance may be cutting many strands of polymer, the overall strain on any knife is lessened if that knife contacts the polymer strands in sequence, as it would do if the blade was helically disposed about 13.

This invention also includes an apparatus for cutting polymers which includes the rotary cutter head described above, a bed knife, and a means for advancing polymer into the rotary cutter head. The bed knife is a usually stationary item that is placed so that clearance between the knives of the rotary cutter head 18 pass as close to the bed knife as reasonably possible while the rotary cutter head is rotating. The "knife edge" of the bed knife will usually have an angle of about 90°, and serves to keep the polymer from bending or otherwise moving as the knives 18 strike the polymer. Most commonly, the polymer is fed over a surface of the bed knife into the rotary cutter head, as shown in FIGS. 1 and 2.

The polymer 4 or 11 is usually advanced continuously as shown in FIGS. 1 and 2, respectively, into the path of the knives 2 or 8 of the rotary cutter head. This requires a means for advancing the polymer. If the cutter apparatus is so disposed the polymer may "fall" into the rotary cutter head by gravity. More commonly though the polymer is fed by means of one or more pairs of feed rolls or a pair of feed conveyors. By feed rolls is meant a pair of rolls having a nip between them. Polymer is fed into the nip and the rolls are driven to move the polymer through the nip and into the rotary cutter head. A feed conveyor is similar, being a conveyor-like apparatus with two conveyor belts with the polymer being driven between the belts. The polymer may simply be fed by being extruded from a die, the movement though and out of the die being the feed mechanism to the rotary cutter head. Other methods of feeding are known.

Inherent in the above discussion is a description of a process for cutting polymer using the rotary cutter head described herein. Many different shapes of polymer may be cut, such as sheets, strands, ribbons and tubes, especially thick-walled tubes. If the polymer to be cut is too thin, such as a small diameter fiber or a thin film the polymer may bend and may or may not be cut, but even if cut the cut may not be of good quality, i.e., be ragged, generate fumes (smaller particles than desired) or cut only partially or unevenly. It is preferred that the smallest cross sectional dimension of the polymer to be cut is about 1 mm or more, preferably about 2 mm or more. The maximum dimension will depend on the polymer being cut as well as the power of the power of the cutter apparatus and the mechanical stress the cutting apparatus can endure.

One preferred form to be cut is one or more polymer strands. By a strand is meant a rod-like essentially continuous length of polymer whose largest cross sectional dimension is no more than 6 times, preferably no more than 3 times, and more preferably no more than 2 times greater than its smallest cross sectional dimension. A preferred cross sectional for a strand is approximately circular or square, with circular being especially preferred. It is preferred that the largest cross sectional dimension of the strand be about 1 to about 8 mm, preferably about 2 mm to about 4 mm. Cutting of strands into relatively short pieces, about 1 to about 8 mm long, or expressed another way the length to diameter ratio of the pellet is about 1, gives an especially useful form of polymer usually called pellets or granules. This is the most common form of solid polymer which is fed to injection molding machines, extruders, and the like.

EXAMPLE

Figure 6A:
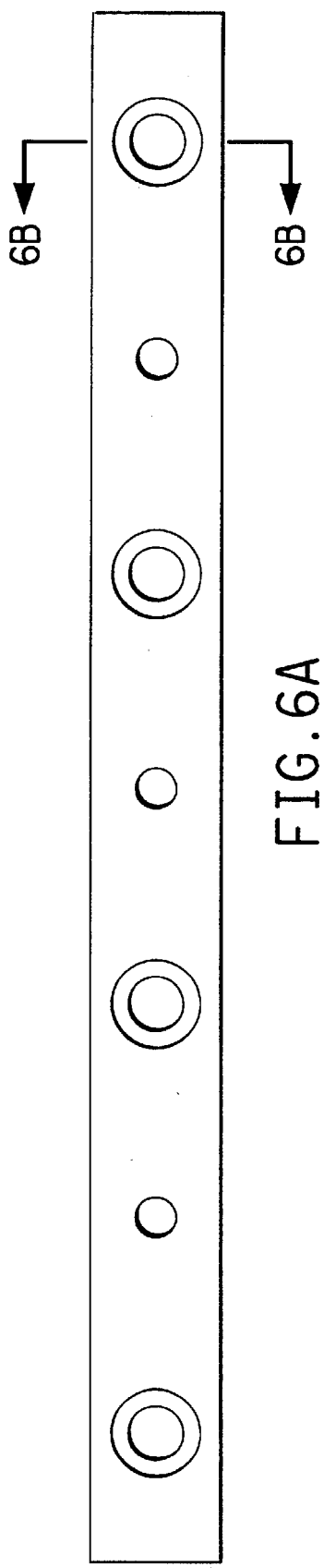
FIG. 6a is a wedge, both in plan view and cross section.
Figure 6C:
FIG. 6 shows a wedge and a cutter blade used in the rotary cutter head of the Example, with dimensions in cm.
FIG. 6b is a cross section of a cutter blade.
Figure 6B:
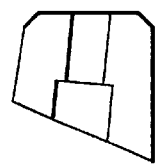

A Model 3508 cutter made by Conair Corp., Bay City, Mich, U.S.A. was used to cut circular cross section polymer strands. The cutter head was used is shown in FIGS. 5 and 6. The diameter of the strands entering the cutter was about 2.3 mm, and the length of the pellet produced was about 2.5 mm. The strands were extruded through die holes about 4.0 to 4.5 mm in diameter and the strands (while molten) were drawn down to about 2.3 mm diameter by the feed mechanism of the cutter. The clearance between the rotor knives and the bed knife was nomially 0.076 mm.

During routine operation, an average of about 545 kg/h of pellets were produced, with the range being about 455 to about 635 kg/h. This entailed feeding 10 to 20 polymer strands at a linear rate of about 60 to about 90 m/min. The maximum rotor speed was 1800 rpm, which was adjusted to produce pellets as described above.

Over a period of about 4 months (about 1,005 actual operating hours) a total of about 450,000 kg of polymer was processed through the cutter as described above. All of this polymer was glass fiber filled, the glass fiber contents ranging from 13 to 45 percent by weight. Smaller amounts of other materials such as carbon black were also present in some of the polymer.

The individual polymers cut at different times were poly (ethylene terephthalate), poly(butylene terephthalate), nylon-6,6 and a polyamide containing both aromatic and aliphatic repeat units. All of these polymers gave a good cut throughout the test, with for instance the amount of fines being produced at the beginning and end of the test on various polymers not differing much. The results were also comparable to those which were usually obtained with the same cutter using a conventional type rotary cutter head, as shown in FIG. 2.

Wear on the knife edges at the end of this test was measured as 0.032 mm. It is difficult to compare this wear to the wear on knife edges from a conventional cutter because of the varying geometry of the knife edge, and the effect of such wear may have on cut quality.

What is claimed is:

1. An apparatus which is a rotary cutter head having an axis of rotation, comprising, one or more knives, each knife having a cutting edge on a circumferential periphery of said rotary cutter head, each knife having a knife angle of about +10° to about −15°, and a cutting edge angle of 70° or more, and provided that no point on a cutting face of said knife is further from said axis of rotation of said rotary cutter head than said cutting edge.

2. An apparatus for cutting polymer, comprising, a bed knife, a rotary cutter head, and a means for advancing polymer into said rotary cutter head, and wherein said rotary cutter head has an axis of rotation and one or more knives, each knife having a cutting edge on a circumferential periphery of said rotary cutter head, each knife having a knife angle of about +10° to about −15°, and a cutting edge angle of 70° or more, and provided that no point on a cutting face of said knife is further from said axis of rotation of said rotary cutter head than said cutting edge.

3. The apparatus as recited in claim 1 or 2 wherein said cutting edge angle is about 80° or more.

4. The apparatus as recited in claim 1 or 2 wherein said knife angle is about 0° to about −5°.

5. The apparatus as recited in claim 2 wherein a distance between said cutting edge and said bed knife is about 0.025 mm to about 0.25 mm.

6. The apparatus as recited in claim 1 or 2 wherein a helical angle between said axis of rotation and said cutting edge is about 0° to about 3°.

7. The apparatus as recited in claim 2 wherein said polymer is a solid.

8. A process for cutting polymer with a rotary cutter, wherein the improvement comprises, using a rotary cutter head which has an axis of rotation and one or more knives, each knife having a cutting edge on a circumferential periphery of said rotary head, each knife having a knife angle of about +10° to about −15°, and a cutting edge angle of 70° or more, and provided that no point on a cutting face of said knife is further from said axis of rotation of said rotary head than said cutting edge.

9. The process as recited in claim 8 wherein said cutting edge angle is about 80° or more.

10. The process as recited in claim 8 wherein said knife angle is about 0° to about −5°.

11. The process as recited in claim 8 wherein a distance between said cutting edge and a bed knife is about 0.025 mm to about 0.25 mm.

12. The process as recited in claim 8 wherein a helical angle between said axis of rotation and said cutting edge is about 0° to about 3°.

13. The process as recited in claim 8 wherein said polymer is a thermoplastic.

14. The process as recited in claim 13 wherein said polymer is originally in the form of a strand.

15. The process as recited in claim 13 wherein said polymer is continuously fed to said rotary cutter head.

16. The process as recited in claim 14 wherein a minimum cross sectional dimension of said strand is about 2 mm.

17. The process as recited in claim 14 wherein said strand has a circular or square cross section.

18. The process as recited in claim 8 or 14 wherein said polymer contains at least one filler or reinforcing agent.

19. The process as recited in claim 8 wherein pellets or granules of said polymer are produced.

20. The process as recited in claim 8 wherein said polymer being cut is solid.

\* \* \* \* \*